US011973364B2

(12) United States Patent
Lu et al.

(10) Patent No.: US 11,973,364 B2
(45) Date of Patent: Apr. 30, 2024

(54) CIRCUIT CONTROL METHOD, BATTERY AND ITS CONTROLLER AND MANAGEMENT SYSTEM, AND ELECTRICAL APPARATUS

(71) Applicant: CONTEMPORARY AMPEREX TECHNOLOGY CO., LIMITED, Ningde (CN)

(72) Inventors: Fangyou Lu, Ningde (CN); Hang Ma, Ningde (CN); Wei Tian, Ningde (CN); Xingchang Wang, Ningde (CN); Zhenhui Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/489,021

(22) Filed: Oct. 18, 2023

(65) Prior Publication Data
US 2024/0047988 A1 Feb. 8, 2024

Related U.S. Application Data

(63) Continuation of application No. PCT/CN2021/122068, filed on Sep. 30, 2021.

(51) Int. Cl.
*H02J 7/00* (2006.01)
(52) U.S. Cl.
CPC ...... *H02J 7/007182* (2020.01); *H02J 7/0014* (2013.01); *H02J 7/0048* (2020.01)
(58) Field of Classification Search
USPC ........................................................ 320/134
See application file for complete search history.

(56) References Cited

U.S. PATENT DOCUMENTS

| 2011/0001352 | A1  | 1/2011 | Tamura et al. |
| 2016/0272076 | A1* | 9/2016 | Fan ......................... B60L 53/14 |
| 2017/0214257 | A1* | 7/2017 | Shiraishi ............. H02J 7/00302 |

FOREIGN PATENT DOCUMENTS

| CN | 101373904 A | 2/2009 |
| CN | 204068363 U | 12/2014 |
| CN | 106364354 A | 2/2017 |

OTHER PUBLICATIONS

International Search Report received in the corresponding International Application PCT/CN2021/122068, mailed May 17, 2022.

(Continued)

*Primary Examiner* — Samuel Berhanu
(74) *Attorney, Agent, or Firm* — Kilpatrick Townsend & Stockton LLP

(57) ABSTRACT

Provided are a circuit control method, a battery controller, a battery management system, a battery, an electrical apparatus, and a vehicle. The circuit control method includes: acquiring an apparatus wake-up signal; determining whether a power source terminal voltage of a charging circuit of a battery on the apparatus is greater than a first threshold and whether a change rate in a first time length is less than a second threshold, wherein the charging circuit is a circuit connecting the battery on the apparatus and a generator, and the power source terminal voltage is an output voltage of the generator; and issuing a first instruction when the power source terminal voltage of the charging circuit of the battery on the apparatus is greater than the first threshold and the change rate in the first time length is less than the second threshold, so that the charging circuit is turned on.

13 Claims, 8 Drawing Sheets

(56) References Cited

OTHER PUBLICATIONS

Written Opinion received in the corresponding International Application PCT/CN2021/122068, mailed May 17, 2022.
The First Office Action received in the counterpart Korean application No. KR10-2023-7025790, issued on Nov. 9, 2023.

* cited by examiner

CIRCUIT CONTROL METHOD, BATTERY AND ITS CONTROLLER AND MANAGEMENT SYSTEM, AND ELECTRICAL APPARATUS

CROSS-REFERENCE TO RELATED APPLICATIONS

This application is a continuation of International Application PCT/CN2021/122068, filed Sep. 30, 2021 and entitled "CIRCUIT CONTROL METHOD, BATTERY AND ITS CONTROLLER AND MANAGEMENT SYSTEM, AND ELECTRICAL APPARATUS", which is incorporated herein by reference in its entirety.

TECHNICAL FIELD

Embodiments of the present application relate to the field of battery technologies, and in particular, to a circuit control method, a battery controller, a battery management system, a battery, an electrical apparatus, and a vehicle.

BACKGROUND

Batteries are widely used in electronic devices such as mobile phones, laptops, battery vehicles, vehicles, planes, ships, toy cars, toy ships, toy planes, and electric tools.

In the development of battery technologies, safety is a problem that cannot be ignored. Especially, when a battery is overcharged, it is easy to cause a serious safety accident. Therefore, how to avoid battery overcharge to improve the safety performance of the battery is a problem that has been a problem of concern in this field.

SUMMARY OF THE INVENTION

In view of the above problem, embodiments of the present application provide a circuit control method, a battery controller, a battery management system, a battery, an electrical apparatus, and a vehicle, which can prevent battery overcharge and improve the safety performance of the battery.

According to the first aspect of the embodiments of the present application, a circuit control method is provided, including: acquiring an apparatus wake-up signal; determining whether a power source terminal voltage of a charging circuit of a battery on the apparatus is greater than a first threshold and whether a change rate in a first time length is less than a second threshold, wherein the charging circuit is a circuit connecting the battery on the apparatus and a generator, and the power source terminal voltage is an output voltage of the generator; and issuing a first instruction when the power source terminal voltage of the charging circuit of the battery on the apparatus is greater than the first threshold and the change rate in the first time length is less than the second threshold, wherein the first instruction is used for controlling a first switch unit in the charging circuit to be closed, so that the charging circuit is turned on.

The circuit control method of the embodiments of the present application acquires the apparatus wake-up signal and the power source terminal voltage of the charging circuit, and determines whether the power source terminal voltage of the charging circuit is greater than the first threshold and whether the change rate in the first time length is less than the second threshold. The apparatus wake-up signal only exists after the apparatus is started, the power source terminal voltage of the charging circuit is greater than the first threshold and the change rate in the first time length is less than the second threshold; therefore, by controlling the charging circuit of the battery to be turned on when all the above conditions are met, the method can make the apparatus start when the charging circuit of the battery is turned on, avoid that the charging circuit of the battery is turned on when the apparatus is not started to cause a switch on the charging circuit to stick due to discharge of a large current in the charging circuit of the battery when the apparatus is subsequently started, and avoid the thermal runaway of the battery caused by overcharge of a lithium battery, thereby improving the safety of the battery.

In some embodiments, the method further comprises: determining whether a state of charge (SOC) of the battery is greater than a third threshold, whether the battery has a fault alarm, and whether a battery cell temperature of the battery is in a first range; issuing the first instruction when the power source terminal voltage of the charging circuit of the battery on the apparatus is greater than the first threshold, and the change rate in the first time length is less than the second threshold, and further comprises: issuing the first instruction when the power source terminal voltage of the charging circuit of the battery on the apparatus is greater than the first threshold, the change rate in the first time length is less than the second threshold, the SOC of the battery is greater than the third threshold, the battery has no fault alarm, and the battery cell temperature of the battery is in the first range.

In the above embodiment, by determining whether the SOC of the battery is greater than the third threshold, whether the battery has a fault alarm, and whether the battery cell temperature of the battery is in the first range, the charging circuit of the battery is controlled to be turned on only when the SOC of the battery is greater than the third threshold, the battery has no fault alarm, and the battery cell temperature of the battery is in the first range, and the battery floating charge and safety problems can be avoided.

In some embodiments, the method further comprises: determining, after the charging circuit of the battery is turned on, whether a change rate of a charging current of the battery in a second time length is greater than a fourth threshold, or whether a voltage of the battery cell in the battery is greater than or equal to a fifth threshold, or whether the battery has a fault alarm, or whether the battery cell temperature is not in the first range, or whether the SOC of the battery is less than or equal to the third threshold; and issuing a second instruction when the change rate of the charging current of the battery in the second time length is greater than the fourth threshold, or the voltage of the battery cell in the battery is greater than or equal to the fifth threshold, or the battery has a fault alarm, or the battery cell temperature is not in the first range, or the SOC of the battery is less than or equal to the third threshold, wherein the second instruction is used for controlling the first switch unit in the charging circuit to be turned off, so that the charging circuit is turned off.

In the above embodiment, by determining whether the SOC of the battery is greater than the third threshold, whether the battery has a fault alarm, and whether the battery cell temperature of the battery is in the first range, the charging circuit of the battery is controlled to be turned on only when the SOC of the battery is greater than the third threshold, the battery has no fault alarm, and the battery cell temperature of the battery is in the first range, and the battery floating charge and safety problems can be avoided.

In some embodiments, the method further comprises: determining whether there is an apparatus wake-up signal and whether the power source terminal voltage is less than a sixth threshold; and issuing a third instruction when there is an apparatus wake-up signal and the power source terminal voltage is lower than the sixth threshold, wherein the third instruction is used for controlling the first switch unit in the charging circuit to be closed, so that the charging circuit is turned on, and the charging circuit is in a first turn-on state.

In the above embodiment, by determining whether there is an apparatus wake-up signal and whether the power source terminal voltage is lower than the sixth threshold, the charging circuit is controlled to be turned on when there is an apparatus wake-up signal and the power source terminal voltage is lower than the sixth threshold, and a lithium battery is used to charge a lead-acid battery, so as to avoid the problem that a vehicle cannot be started due the power loss of the lead-acid battery when the vehicle is placed for a long time.

In some embodiments, the method further comprises: determining whether the SOC of the battery is greater than a seventh threshold and whether the battery has a fault alarm; issuing the third instruction when there is an apparatus wake-up signal and the power source terminal voltage is less than the sixth threshold, and further comprises: issuing the third instruction when there is an apparatus wake-up signal, the power source terminal voltage is less than the sixth threshold, the SOC of the battery is greater than the seventh threshold, and the battery has no fault alarm.

In the above embodiment, by determining whether the SOC of the battery is greater than the seventh threshold and whether the battery has a fault alarm, the charging circuit is controlled to be turned on when the SOC of the battery is greater than the seventh threshold and the battery has no fault alarm, so as to avoid over-discharge of the lithium battery and safety problems.

In some embodiments, the method further comprises: determining, in the first turn-on state, whether the turn-on time of the charging circuit is greater than an eighth threshold; and issuing a fourth instruction if the turn-on time of the charging circuit is greater than the eighth threshold, wherein the fourth instruction is used for controlling the first switch unit in the charging circuit to be turned off, so that the charging circuit is turned off.

In the above embodiment, by determining whether the turn-on time of the charging circuit is greater than the eighth threshold, the charging circuit is controlled to be turned off when the turn-on time of the charging circuit is greater than the eighth threshold, which not only ensures that the lithium battery can charge the lead-acid battery to meet electric energy required for the vehicle to start once, but also avoids over-discharge of the lithium battery.

In some embodiments, the method further comprises: determining whether the SOC of the battery is greater than the seventh threshold; and issuing a fifth instruction if the SOC of the battery is greater than the seventh threshold, wherein the fifth instruction is used for controlling a second switch unit in a discharging circuit of the battery to be closed, so that the discharging circuit is turned on, and the discharging circuit is a circuit connecting the battery on the apparatus and an electrical device.

In the above embodiment, by determining whether the SOC of the battery is greater than the seventh threshold, the discharging circuit of the battery is controlled to be turned on when the SOC of the battery is greater than the seventh threshold, so as to avoid over-discharge of the lithium battery.

In some embodiments, the method further comprises: determining, after the discharging circuit of the battery is turned on, whether there is the apparatus wake-up signal, or whether the battery has a fault alarm, or whether the SOC of the battery is less than or equal to the seventh threshold; and issuing a sixth instruction when there is the apparatus wake-up signal, or the battery has a fault alarm, or the SOC of the battery is less than or equal to the seventh threshold, wherein the sixth instruction is used for controlling the second switch unit in the discharging circuit to be turned off, so that the discharging circuit is turned off.

In the above embodiments, by determining whether there is no apparatus wake-up signal, or whether the battery has a fault alarm, or whether the SOC of the battery is less than or equal to the seventh threshold, the discharging circuit is controlled to be turned off when there is no apparatus wake-up signal, or the battery has a fault alarm, or the SOC of the battery is less than or equal to the seventh threshold, so as to avoid the over-discharge of the lithium battery and safety problems.

According to the second aspect of the embodiments of the present application, a battery controller is provided, including: one or a plurality of processors working individually or jointly, the processor being used for performing the steps of the circuit control method described above.

According to the third aspect of the embodiments of the present application, a battery management system is provided, including: at least one processor; and a memory communicatively connected to the at least one processor; wherein the memory stores instructions executable by the at least one processor, the instructions are executed by the at least one processor to enable the at least one processor to perform the circuit control method described above.

According to the fourth aspect of the embodiments of the present application, a battery is provided, including: the battery controller described above, or the battery management system described above.

According to the fifth aspect of the embodiments of the present application, an electrical apparatus is provided, including the battery described above, the battery being configured to provide electric energy.

According to the sixth aspect of the embodiments of the present application, a vehicle is provided, including a lithium battery, a generator, and a vehicle wake-up switch; wherein the lithium battery is connected to the generator to form a charging circuit, the lithium battery includes a battery management system, and the battery management system is used for: acquiring a vehicle wake-up signal; determining whether a power source terminal voltage of a charging circuit of the lithium battery on the vehicle is greater than a first threshold and whether a change rate in a first time length is less than a second threshold, wherein the charging circuit is a circuit connecting the lithium battery on the vehicle and the generator and the power source terminal voltage is an output voltage of the generator; and issuing a first instruction when the power source terminal voltage of the charging circuit of the battery on the vehicle is greater than the first threshold, and the change rate in the first time length is less than the second threshold, wherein the first instruction is used for controlling a first switch unit in the charging circuit to be closed, so that the charging circuit is turned on.

The above description is only a summary of the technical solutions of the present application. In order to be able to understand the technical indicates of the present application more clearly, the technical indicates can be implemented according to the content of the specification. Furthermore, to make the above and other objectives, features and advantages of the present application more comprehensible, specific implementations of the present application are exemplified below.

DESCRIPTION OF DRAWINGS

The features, advantages, and technical effects of example embodiments of the present application will be described below with reference to the accompanying drawings.

DETAILED DESCRIPTION

Figure 1:
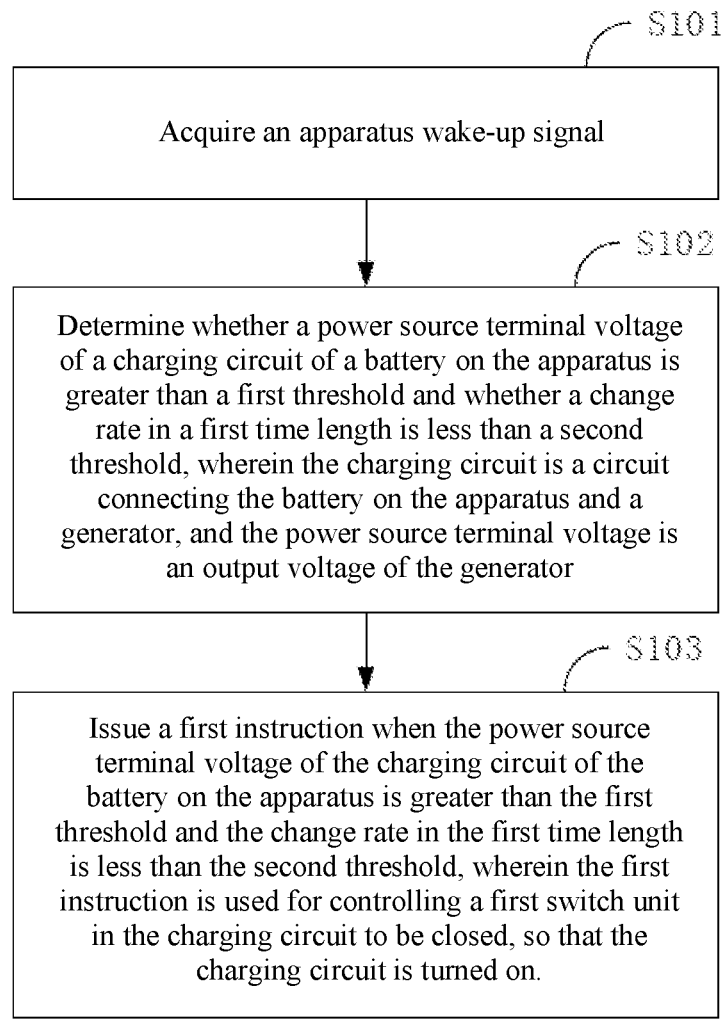
FIG. 1 is a schematic flowchart of a circuit control method according to some embodiments of the present application.

For the objects, technical solutions and advantages of the examples of the present application to be clearer, the technical solutions in the examples of the present application will be clearly and completely described below in conjunction with the drawings in the examples of the present application, and it is apparent that the described examples are a part of the examples of the present application rather than all the examples. Based on the examples in the present application, all other examples obtained by those of ordinary skill in the art without creative effort fall within the protection scope of the present application.

Unless otherwise defined, all technical and scientific terms used in the present application have the same meaning as commonly understood by those skilled in the art to which the present application belongs. The terms used in the applied specification in the present application are for the purpose of describing specific embodiments only, and are not intended to limit the present application. The terms "include/comprise" and "have" and any variations thereof in the specification and claims of the present application as well as in the above description of drawings are intended to cover a non-exclusive inclusion. The terms "first," "second," and the like in the specification and claims of the present application or in the above drawings are used for distinguishing different objects, not for describing a particular order or primary and secondary relationship. In the description of the present application, the meaning of "a plurality of" is two or more, unless otherwise illustrated.

Reference in the present application to "an embodiment" indicates that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is understood explicitly and implicitly by those skilled in the art that the embodiments described in the present application can be combined with other embodiments.

As described above, it should be emphasized that when a term "including/containing" is used in the present specification, it is used for clearly showing and meaning the presence of the feature, integer, step, or assembly, but does not exclude the presence or addition of one or more other features, integers, steps, and parts, or groups of features, integers, steps, and parts. As used in the present application, the singular forms "one," "a," and "the" also include the plural form, unless expressly indicated otherwise in the context.

The words "a" and "one" in the present specification may mean one, but may also be consistent with the meaning of "at least one" or "one or more". The term "about" generally indicates that 10% of a value referred herein is added to or reduced from the value, or more specifically, 5% is added to or reduced from the value. The term "or" as used in the claims indicates "and/or" unless it is expressly stated that it refers only to an alternative solution.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally indicates that the associated objects before and after it are in an "or" relationship.

Batteries mentioned in the art may be classified into primary batteries and rechargeable batteries according to whether they are rechargeable. Primary batteries are commonly known as "disposable" batteries and primary batteries, because after their power is exhausted, they can no longer be recharged and can only be discarded. Rechargeable batteries are also known as secondary batteries, second-level batteries, or storage batteries. The rechargeable batteries are different from primary batteries in production materials and processes, and are advantageous in that they can be recycled many times after charging. An output current load of a rechargeable battery is higher than that of most primary batteries. At present, common types of rechargeable batteries are: lead-acid batteries, nickel-metal hydride batteries, and lithium-ion batteries. The lithium-ion battery has advantages such as light weight, large capacity (the capacity is 1.5 times to 2 times of the capacity of a nickel-metal hydride battery having the same weight), and memoryless effect, and has a very low self-discharge rate, so even if the price is relatively high, it is still widely used.

The battery described in the embodiments of the present application refers to a rechargeable battery. The idea of the present application will be described hereinafter mainly by taking a lead-acid battery and a lithium-ion battery as examples. It should be understood that a rechargeable battery of any other appropriate type is applicable. The battery mentioned in the embodiments of the present application refers to a single physical module including one or a plurality of battery cells (or referred to as cells) to provide a higher voltage and capacity. For example, the battery mentioned in the present application may include a battery module, a battery pack, or the like. The battery cell includes a positive electrode sheet, a negative electrode sheet, an electrolyte solution, and a separator, and is a basic structure unit forming a battery module and a battery pack. Commonly used positive electrode materials for lithium-ion batteries are lithium cobalt oxide, lithium manganate, lithium nickelate, lithium iron phosphate and ternary materials (such as lithium nickel cobalt manganese oxide), commonly used negative electrode materials include carbon materials (such as graphite), silicon-based materials, and the like, and commonly used separator materials include Polyolefin materials such as polyethylene (PE) or polypropylene (PP). The battery cells are generally classified into three types according to encapsulating manners: cylindrical battery cells, rectangular battery cells, and pouch cells.

A plurality of battery cells may be connected in series and/or parallel via electrode terminals for a variety of application scenarios. In some high-power application scenarios such as electric vehicles, applications of the batteries include three levels: battery cells, battery modules, and battery packs. The battery module is formed by electrically connecting a certain number of battery cells together and putting them into a frame in order to protect the battery cells from external impact, heat, vibration, and the like. The battery pack is a final state of a battery system installed in a vehicle. Most current battery packs are manufactured by equipping various control and protection systems such as a Battery Management System (BMS) and a thermal management component on one or a plurality of battery modules. With the development of technologies, the battery module may be omitted. That is, the battery pack is directly formed from the battery cells. This improvement has led to an increase in the weight energy density and the volumetric energy density of the battery system and a significant reduction in the number of parts. The battery mentioned in the present application includes a battery module or a battery pack.

At present, a power source on the vehicle is mainly used for motor starting, and generally uses a lead-acid battery as the power source or uses a lithium battery as the power source. With the improvement of social and economic level, requirements for environmental protection, energy conservation, and comfort of vehicles have gradually increased, and therefore, corresponding on-board devices have also emerged. For example, a parking air conditioner solves requirements of a user for comfort such as the temperature, humidity, and flow rate of the ambient air in the vehicle. Therefore, the power source on the vehicle must not only meet the requirements of motor starting in various environments, but also meet the requirements of the vehicle to provide power for on-board electrical devices such as the parking air conditioner when parking.

The lead-acid battery has a low price and stable quality, but has a large weight, a high self-discharge rate, and a short life. The lithium battery has a light weight, a small size, a low self-discharge rate, and a long life, but a lithium battery with a large capacity and high rate is expensive and cannot meet the motor starting requirement at a low temperature. Therefore, a lead-acid battery connected in parallel with a lithium battery is usually used as a starting and parking power source for a vehicle, where the lead-acid battery is mainly used for motor starting, and the lithium battery is mainly used for providing power for the parking air conditioner.

However, when the lead-acid battery connected in parallel with the lithium battery is as the starting and parking power source for the vehicle, if the vehicle is started when a switch of a lithium battery charging circuit is closed, the lithium battery charging circuit will be discharged with a large current, resulting in sticking of the switch (such as a relay) on the charging circuit, thereby causing overcharging of the lithium battery, causing thermal runaway of the battery, and causing a safety accident such as battery fire.

In view of this, the present application provides a circuit control method, a battery controller, a battery management system, a battery, an electrical apparatus, and a vehicle, and designs thereof will be described in detail below. It is understandable that the circuit control method, the battery controller, the battery management system, and the battery described in embodiments of the present application are applicable to various apparatuses using batteries, especially vehicles. For the convenience of description in the following embodiments, illustration is made by using an application in a vehicle as an example.

FIG. 1 is a schematic flowchart of a circuit control method according to some embodiments of the present application. The circuit control method 100 may be applied to a battery in an electrical apparatus, and further may be applied to a BMS of the battery. The idea of the present application may be described below by taking applying the method to the BMS of the battery on the vehicle as an example. The circuit control method includes the following steps:

S101: Acquire an apparatus wake-up signal;

S102: Determine whether a power source terminal voltage of a charging circuit of the battery on the apparatus is greater than a first threshold and whether a change rate in a first time length is less than a second threshold, wherein the charging circuit is a circuit connecting the battery on the apparatus and a generator, and the power source terminal voltage is an output voltage of the generator;

S103: Issue a first instruction when the power source terminal voltage of the charging circuit of the battery on the apparatus is greater than the first threshold and the change rate in the first time length is less than the second threshold, wherein the first instruction is used for controlling a first switch unit in the charging circuit to be closed, so that the charging circuit is turned on.

Figure 2:
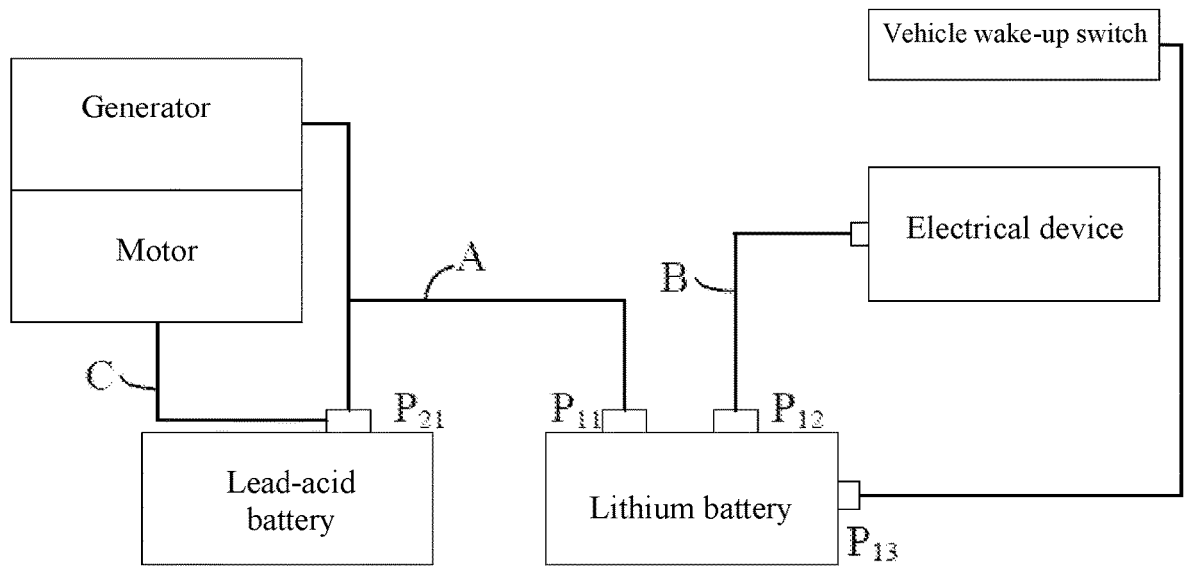
FIG. 2 is a structural block diagram of a power system of an electrical apparatus applying the method of FIG. 1.

FIG. 2 is a structural block diagram of a power system of an electrical apparatus applying the method of FIG. 1. Referring to FIG. 2, the electrical apparatus includes a parking power source (a lithium battery as an example in the present embodiment), a lead-acid battery, a generator, a motor, a vehicle wake-up switch, and an electrical device. A first port $P_{11}$ of the lithium battery is connected to the generator and a first port $P_{21}$ of the lead-acid battery respectively to form a charging circuit A; a second port $P_{12}$ of the lithium battery is connected to the electrical device to form a discharging circuit B between the lithium battery and the electrical device. The first port $P_{21}$ of the lead-acid battery is further connected to the motor to form a circuit C that provides power for starting the motor. A third port $P_{13}$ of the lithium battery is connected to the vehicle wake-up switch, for receiving the apparatus wake-up signal.

Figure 3:
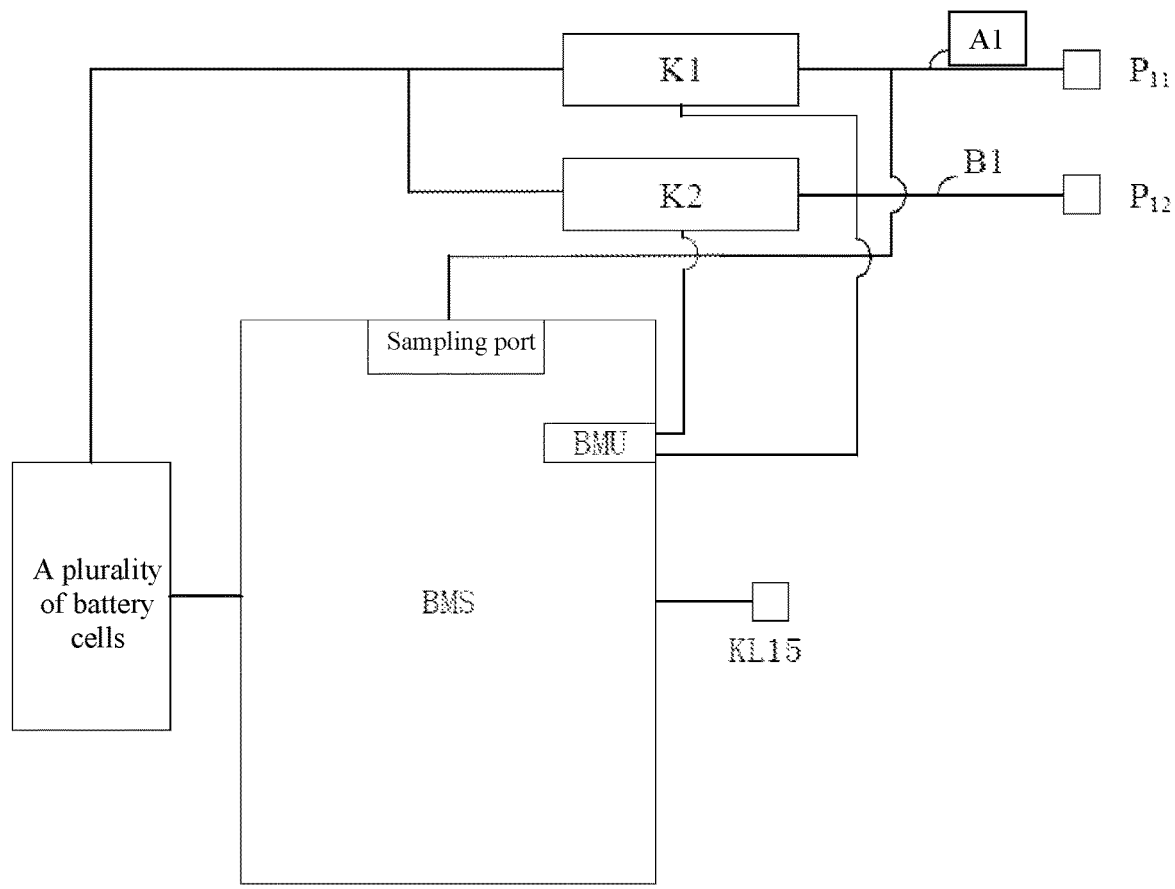
FIG. 3 is a structural circuit diagram of a battery applying the method of FIG. 1.

The charging circuit is the circuit connecting the battery on the apparatus to the generator, and specifically, may be the charging circuit A connecting the lithium battery to the generator and the lead-acid battery in FIG. 2. FIG. 3 is a structural circuit diagram of a battery applying the method of FIG. 1, and the charging circuit may be the charging circuit A1 in FIG. 3.

The apparatus wake-up signal is an electrical signal used for starting the apparatus. For example, in a vehicle, an ON gear of a vehicle keyhole is KL15, and has one end connected to an on-board power source and the other end connected to the BMS. Before ignition, the KL15 switch is turned off, there is no signal input, and the BMS does not work. After ignition, the KL15 switch is closed, enables a power management chip, and sends a KL15 hard-wire wake-up signal to the BMS to wake up the BMS, thereby starting the vehicle. Therefore, the apparatus wake-up signal in the vehicle may be the KL15 hard-wire wake-up signal, and the signal is acquired by the BMS after the vehicle ignition.

There being an apparatus wake-up signal is a first condition that the charging circuit can be turned on, the power source terminal voltage of the charging circuit of the battery on the apparatus being greater than a first threshold is a second condition that the charging circuit can be turned on, and a change rate of the power source terminal voltage of the charging circuit of the battery on the apparatus in a first time length being less than a second threshold is a third condition that the charging circuit can be turned on.

If there is no apparatus wake-up signal, the first condition is not met, indicating that the vehicle has not started, and at this time, if the charging circuit is turned on, it may cause the charging circuit of the lithium battery described above to appear high current discharge, thereby resulting in overcharge of the lithium battery, and causing the problem of thermal runaway of the battery. There is an apparatus wake-up signal, and the first condition is met, indicating that the vehicle has been started and the charging circuit may be turned on.

In order to further avoid the charging circuit from turning on when the vehicle is not started, some parameters of the battery are further collected through the BMS and determined accordingly. For example, the power source terminal voltage of the charging circuit of the battery may be collected. The power source terminal voltage is an output voltage of the generator, for example, a voltage at a point a connected to the first port of the generator in FIG. 3. The point a is located on an external side (the meaning of "external" here refers to the connection to the outside of the battery) of a first switch unit K1 on the charging circuit A1, and the voltage at the point a is an external voltage of the first switch unit K1 on the charging circuit A1. It is understandable that since the point a is also connected to the first port of the lead-acid battery, the external voltage is also the voltage of the lead-acid battery. The voltage of the point a may be sampled by connecting the point a to a sampling port of the BMS. The first switch unit K1 may be an element, such as a relay, that can realize turning on and turning off of the circuit. It is understandable that the first switch unit is located inside the lithium battery.

The first threshold may be set for the power source terminal voltage of the charging circuit of the battery, and if the voltage is less than or equal to the first threshold, the second condition is not met, indicating that the vehicle has not started and the charging circuit cannot be turned on. If the voltage is greater than the first threshold, the second condition is met, indicating that the vehicle has been started and the charging circuit may be turn-on.

Under normal circumstances, after a long-time parking, the voltage of the lead-acid battery may be higher than that of the lithium battery after standing still. After the vehicle starts and the rotational speed of the motor is greater than or equal to the idle speed, the output voltage of the generator is in a normal state, which is generally higher than the maximum voltage after the lead-acid battery is stood still. Therefore, the first threshold may be set according to the output voltage of the generator and the maximum voltage after the lead-acid battery is stood still. Therefore, the first threshold may be set to be less than the output voltage of the generator and greater than the maximum voltage after the lead-acid battery is stood still for a certain time length. For example, the output voltage of the generator is 28±0.3 V, and the maximum voltage of the lead-acid battery after standing still for 300 s is reduced from 29 V to about 26 V, the first threshold is set to a value greater than 26 V and less than 27.7 V, such as 27 V. If the power source terminal voltage of the charging circuit is less than or equal to the first threshold, it indicates that the vehicle has not been started. If the voltage is greater than the first threshold, it indicates that the vehicle has been started. The above certain time length may be set according to a time length for the voltage of the lead-acid battery to drop to a stable value after standing still. For example, the certain time length is set as the shortest time length required for the voltage of the lead-acid battery to drop to a stable value after standing still.

The voltage of the lead-acid battery may be higher than that of the lithium battery after it is fully charged and standing still. However, if the vehicle stalls after it is fully charged, that is, the charging circuit of the lead-acid battery is powered off, and after standing still for a certain time length, the voltage of the lead-acid battery will drop to a certain extent. Therefore, a second threshold may also be set for the change rate of the power source terminal voltage of the battery charging circuit in the first time length. If the change rate is greater than or equal to the second threshold, and the third condition is not met, it indicates that the vehicle has been powered off and not started, and the charging circuit cannot be turned on. If the change rate is less than the second threshold, and the third condition is met, it indicates that the vehicle has been started and the charging circuit can be turned on.

The BMS can calculate the change rate of the power source terminal voltage in the first time length based on the acquired power source terminal voltage and compare it with the second threshold. The first time length may be determined according to a time range in which the voltage change rate is obvious after the lead-acid battery is fully charged and power-off stood still. The second threshold may be set according to a minimum value of the change rate between a maximum voltage after the lead-acid battery is fully charged and a maximum voltage after the power-off standing still for a certain time length. The second threshold may be set to be less than a minimum value of the change rate between the maximum voltage after the lead-acid battery is fully charged and the maximum voltage after the power-off standing still for a certain time length. For example, if the time range in which the voltage change rate of the lead-acid battery after full charge is 5 minutes (300 s), the first time length may be set to 300 s. The maximum voltage of the lead-acid battery after full charge is 29 V. If the voltage drops to 26 V after power-off standing still for 300 s, the second threshold may be set to a value less than (29−26)/29=10.34%, such as 10%.

To sum up, in S103, the first switch unit in the charging circuit is controlled to be closed only when the first condition, the second condition, and the third condition above are met, so that the charging circuit is turned on.

It is understandable that when any of the first condition, the second condition, and the third condition above is not met, the charging circuit will not be turned on, so as to maintain the turn-off state of the charging circuit or cause the charging circuit to be turned off.

The first instruction may be issued to the first switch unit in the charging circuit through a Battery Management Unit (BMU) interface on the BMS, so as to control the first switch unit in the charging circuit to be closed, so that the charging circuit is turned on. The first instruction may be a high low-level signal.

The circuit control method of the embodiments of the present application acquires the apparatus wake-up signal and the power source terminal voltage of the charging circuit, and determines whether the power source terminal voltage of the charging circuit is greater than the first threshold and whether the change rate in the first time length is less than the second threshold. The apparatus wake-up signal only exists after the apparatus is started, the power source terminal voltage of the charging circuit is greater than the first threshold and the change rate in the first time length is less than the second threshold; therefore, by controlling the charging circuit of the battery to be turned on when all the above conditions are met, the method can make the apparatus start when the charging circuit of the battery is turned on, avoid that the charging circuit of the battery is turned on when the apparatus is not started to cause a switch on the charging circuit to stick due to discharge of a large current in the charging circuit of the battery when the apparatus is subsequently started, and avoid the thermal runaway of the battery caused by overcharge of a lithium battery, thereby improving the safety of the battery.

Figure 4:
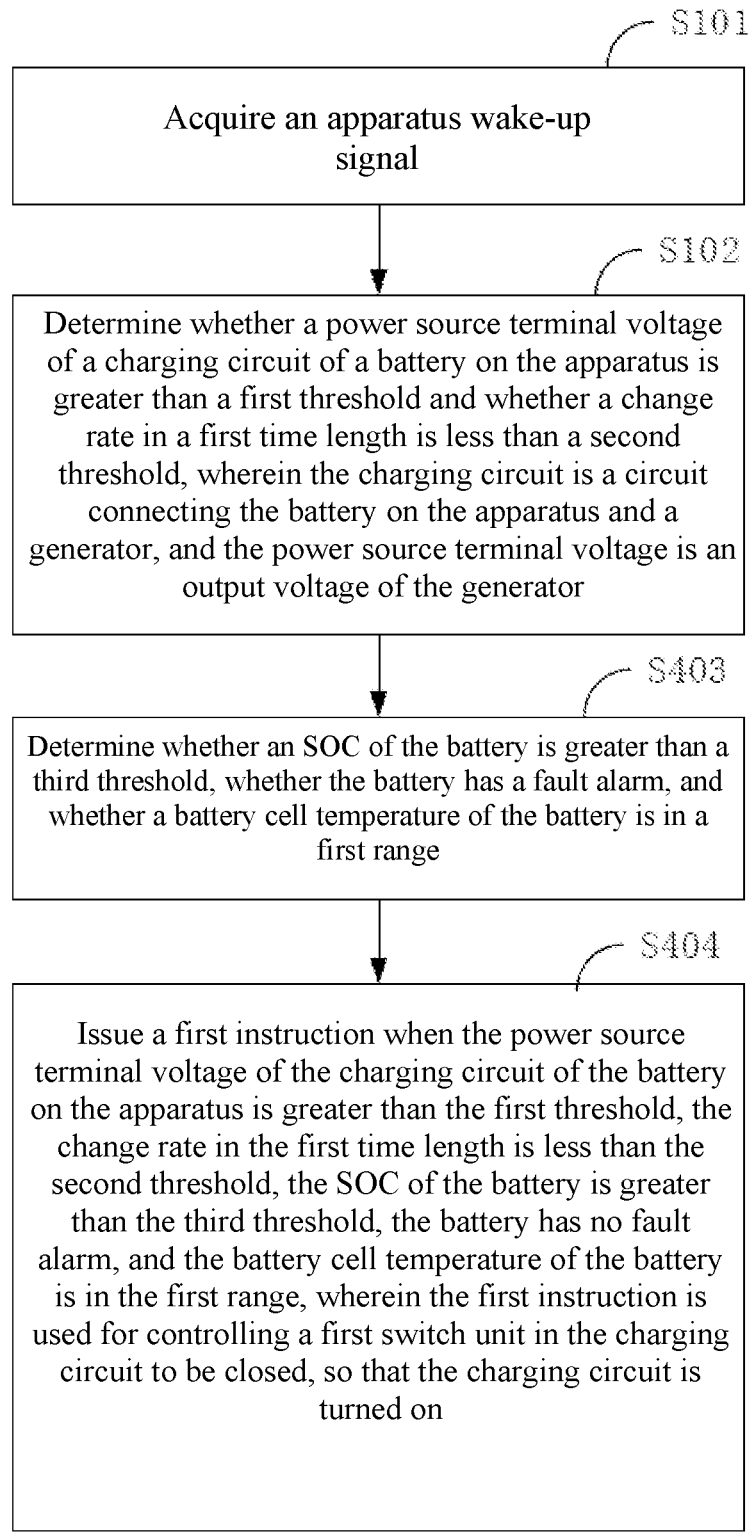
FIG. 4 is a schematic flowchart of a circuit control method according to some embodiments of the present application.

In some embodiments, other conditions for turning on of the charging circuit may also be set. FIG. 4 is a schematic flowchart of a circuit control method according to some embodiments of the present application. As shown in FIG. 4, the circuit control method includes the following steps:

S101: Acquire an apparatus wake-up signal;

S102: Determine whether a power source terminal voltage of a charging circuit of the battery on the apparatus is greater than a first threshold and whether a change rate in a first time length is less than a second threshold, wherein the charging circuit is a circuit connecting the battery on the apparatus and a generator, and the power source terminal voltage is an output voltage of the generator;

S403: Determine whether a state of charge (SOC) of the battery is greater than a third threshold, whether the battery has a fault alarm, and whether a battery cell temperature of the battery is in a first range; and S404: Issue a first instruction when the power source terminal voltage of the charging circuit of the battery on the apparatus is greater than the first threshold, the change rate in the first time length is less than the second threshold, the SOC of the battery is greater than the third threshold, the battery has no fault alarm, and the battery cell temperature of the battery is in the first range, wherein the first instruction is used for controlling a first switch unit in the charging circuit to be closed, so that the charging circuit is turned on.

The specific implementation process of S101 and S102 is basically the same as that of S101 and S102 in the above embodiments, and the implementation process may be obtained with reference to the previous description.

The SOC of the battery being greater than the third threshold is a fourth condition that the charging circuit can be turned on, there being no fault alarm in the battery is a fifth condition that the charging circuit can be turned on, and the battery cell temperature of the battery being in the first range is a sixth condition that the charging circuit can be turned on.

The SOC refers to State of Charge. The BMS acquires the SOC of the lithium battery and determines whether the SOC is greater than a third threshold. The third threshold may be determined according to a value after the lithium battery is fully charged and its charging circuit is turned off, and the cell voltage of the lithium battery drops due to depolarization of the battery cell. For example, the third threshold is 95%. After the lithium battery is fully charged and its charging circuit is turned off, and the cell voltage of the lithium battery drops due to depolarization of the battery cell, if the charging circuit is closed at this time, floating charge may be caused. Therefore, the SOC being greater than the third threshold is a fourth condition that the charging circuit can be turned on, and only when the SOC is greater than the third threshold, can the charging circuit be controlled to be turned on and avoid the above floating charge problem.

If the battery has a fault alarm, the battery cannot be charged; otherwise, it is easy to cause safety problems. Only when the battery has no fault alarm and the fifth condition is met, can the charging circuit be controlled to be turned on and avoid safety problems.

When the battery is charged, it is necessary to ensure that the internal battery cell temperature is within an allowable charging range; otherwise, it is easy to cause safety problems. The first range is the allowable charging range, for example, 0° C. to 55° C. Only when the battery cell temperature of the battery is not in the first range and the sixth condition is met, can the charging circuit be controlled to be turned on and avoid safety problems.

The fourth condition, the fifth condition, and the sixth condition and the first condition, the second condition, and the third condition aforementioned together are used as necessary conditions for determining whether the charging circuit can be turned on. Therefore, in S404, only when the above conditions are met, can the first switch unit in the charging circuit be controlled to be closed, so that the charging circuit is turned on.

It is understandable that when any of the above conditions is not met, the charging circuit will not be turned on, so as to maintain a turn-off state of the charging circuit, or make the charging circuit to be turned off.

In the above embodiment, by determining whether the SOC of the battery is greater than the third threshold, whether the battery has a fault alarm, and whether the battery cell temperature of the battery is in the first range, the charging circuit of the battery is controlled to be turned on only when the SOC of the battery is greater than the third threshold, the battery has no fault alarm, and the battery cell temperature of the battery is in the first range, and the battery floating charge and safety problems can be avoided.

Figure 5:
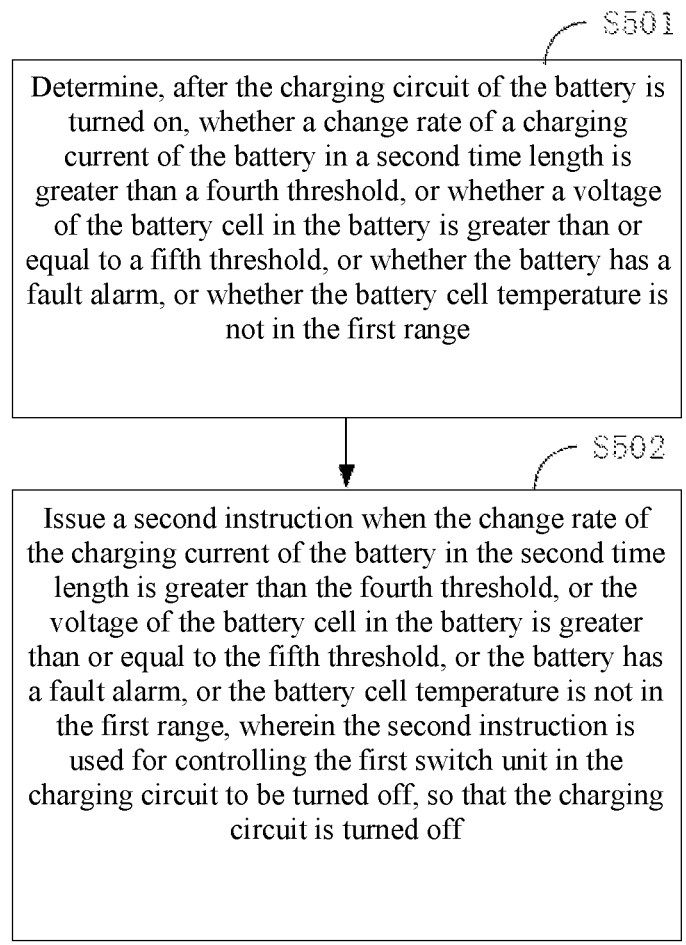
FIG. 5 is a schematic flowchart of a circuit control method according to some embodiments of the present application.

In some embodiments, a technical solution of how to control the charging circuit of the battery to be turned off after it is turned on is further provided. FIG. 5 is a schematic flowchart of a circuit control method according to some embodiments of the present application. As shown in FIG. 5, the circuit control method includes the following steps:

S501: Determine, after the charging circuit of the battery is turned on, whether a change rate of a charging current of the battery in a second time length is greater than a fourth threshold, or whether a voltage of the battery cell in the battery is greater than or equal to a fifth threshold, or whether the battery has a fault alarm, or whether the battery cell temperature is not in the first range; and S502: Issue a second instruction when the change rate of the charging current of the battery in the second time length is greater than the fourth threshold, or the voltage of the battery cell in the battery is greater than or equal to the fifth threshold, or the battery has a fault alarm, or the battery cell temperature is not in the first range, wherein the second instruction is used for controlling the first switch unit in the charging circuit to be turned off, so that the charging circuit is turned off.

The change rate of the charging current of the battery in the second time length being greater than the fourth threshold is a first condition that the charging circuit needs to be turned off, the voltage of the battery cell in the battery being greater than or equal to the fifth threshold is a second condition that the charging circuit needs to be turned off, the battery having a fault alarm is a third condition that the charging circuit needs to be turned off, and the battery cell temperature being not in the first range is a fourth condition that the charging circuit needs to be turned off.

Generally, after the vehicle starts, the charging circuit of the battery is turned on, and the generator charges the lithium battery. If the voltage of the lead-acid battery is greater than the first threshold (for example>27 V) after the vehicle is stalled, the lead-acid battery will charge the lithium battery at this time, and the charging circuit remains on. When the vehicle is started immediately after stalling, if the charging circuit is turned on, the charging circuit will be discharged with a large current, resulting in sticking of the switch (such as a relay) on the charging circuit, thereby causing overcharging of the lithium battery, causing thermal runaway of the battery, and causing a safety accident such as battery fire. Therefore, it is necessary to set the conditions for controlling the charging circuit of the battery to be turned off that are applicable in this case, for example, the charging circuit of the battery needs to be turned off when the vehicle is stalled (not started).

After the vehicle starts, the generator charges the lithium battery, the charging current of the battery is a normal value, if the vehicle suddenly stalls, the charging current will quickly fall to 0, and therefore, by setting that a change rate of the charging current of the battery in a second time length being greater than a fourth threshold is a first condition that the charging circuit needs to be turned off, if the change rate of the charging current of the battery in the second time length is less than or equal to the fourth threshold, and the first condition is not met, it indicates that the vehicle has started without stalling, there is no need to turn off the charging circuit, and the charging circuit can remain on. If the change rate of the charging current of the battery in the second time length is greater than the fourth threshold, and the first condition is met, it indicates that the vehicle has stalled and the charging circuit needs to be turned off to avoid the above problem of overcharging the lithium battery.

The BMS may calculate the change rate of the charging current in the second time length based on the acquired charging current of the battery and compare it with the fourth threshold. It takes approximately a certain time length for the generator output current to change from a normal value to no output, and therefore, the second time length and the fourth threshold may be set according to the time length and the change rate of the current from the normal value to no output. For example, it takes about 1 s for the generator output current to change from a normal value of 110 A to no output 0 A, and therefore, the second time length may be set to 1 s and the fourth threshold is 110 A.

When the battery is charged, overcharge protection is required to prevent overcharge. Therefore, the overcharge protection of the battery may be performed by setting a fifth threshold. The fifth threshold may be set according to the overcharge protection mechanism of the battery, such as setting the fifth threshold to 3.65 V. If the voltage of the battery cell in the battery is greater than or equal to the fifth threshold, and the second condition is met, the charging circuit needs to be turned off in this case to avoid overcharging the lithium battery. If the voltage of the battery cell in the battery is less than the fifth threshold, and the second condition is not met, the charging circuit needs not to be turned off in this case, and the charging circuit may remain turned on.

If the battery has a fault alarm, the battery cannot be charged; otherwise, it is easy to cause safety problems. At this time, the third condition is met, and the charging circuit needs to be controlled to be turned off to avoid safety problems.

When the battery is charged, it is necessary to ensure that the internal battery cell temperature is within an allowable charging range; otherwise, it is easy to cause safety problems. The first range is the allowable charging range, for example, 0° C. to 55° C. When the battery cell temperature of the battery is not in the first range and the fourth condition is met, the charging circuit needs to be controlled to be turned off to avoid safety problems.

The first condition, the second condition, the third condition, and the fourth condition above are used as necessary conditions for determining whether the charging circuit needs to be turned off after the charging circuit of the battery is turned on. Therefore, in S502, when any one of the above conditions is met, the first switch unit in the charging circuit may be controlled to be turned off, so that the charging circuit is turned off.

A second instruction may be issued to the first switch unit in the charging circuit through a BMU interface on the BMS, thereby controlling the first switch unit in the charging circuit to be turned off, so that the charging circuit is turned off. The second instruction may be a high low-level signal.

It is understandable that in some embodiments, the circuit control method may further include steps in any embodiment of FIG. 1 to FIG. 4, or a combination of steps in the embodiments.

In some embodiments, if there is no apparatus wake-up signal, it indicates that the vehicle has not started, and at this time, it is also required to control the charging circuit to be turned off.

In the above embodiment, by determining whether the change rate of the charging current of the battery in the second time length is greater than the fourth threshold, or whether the voltage of the battery cell in the battery is greater than or equal to the fifth threshold, or whether the battery has a fault alarm, or whether the battery cell temperature is not in the first range, the charging circuit is controlled to be turned off when the change rate of the charging current of the battery in the second time length is greater than the fourth threshold, or the voltage of the battery cell in the battery is greater than or equal to the fifth threshold, or the battery has a fault alarm, or the battery cell temperature is not in the first range, thereby ensuring that the charging circuit is turned off when the vehicle is not started, and avoiding overcharging of the lithium battery and safety problems.

In the above embodiment, by determining whether the SOC of the battery is greater than the third threshold, whether the battery has a fault alarm, and whether the battery cell temperature of the battery is in the first range, the charging circuit of the battery is controlled to be turned on only when the SOC of the battery is greater than the third threshold, the battery has no fault alarm, and the battery cell temperature of the battery is in the first range, and the battery floating charge and safety problems can be avoided.

Figure 6:
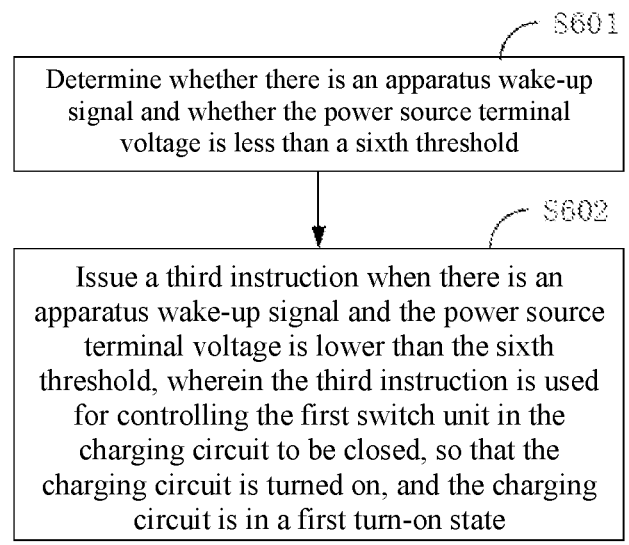
FIG. 6 is a schematic flowchart of a circuit control method according to some embodiments of the present application.

The lead-acid battery has a large weight and a high self-discharge rate that may reach 20% to 30% per month, thus having a short life. When the vehicle is placed for a long time, the vehicle cannot be started due to under voltage of the lead-acid battery. Therefore, in some embodiments, a technical solution of how to control the charging circuit to be turned on after the battery has been placed for a long time without being used is further provided. FIG. 6 is a schematic flowchart of a circuit control method according to some embodiments of the present application. As shown in FIG. 6, the circuit control method includes the following steps:

S601: Determine whether there is an apparatus wake-up signal and whether the power source terminal voltage is less than a sixth threshold; and S602: Issue a third instruction when there is an apparatus wake-up signal and the power source terminal voltage is lower than the sixth threshold, wherein the third instruction is used for controlling the first switch unit in the charging circuit to be closed, so that the charging circuit is turned on, and the charging circuit is in a first turn-on state.

The sixth threshold may be set according to a maximum value of the voltage when the lead-acid battery is under voltage, and the sixth threshold may be set to the maximum value of the voltage when the lead-acid battery is in under voltage. For example, if the voltage of the lead-acid battery in an under voltage state is about 16 V to 22 V, the sixth threshold may be set to 22 V. When the power source terminal voltage is less than the value, it indicates that the lead-acid battery is in an under voltage state, and the charging circuit may be turned on to charge the lead-acid battery, which can provide electric energy for subsequently starting the vehicle, extend the service life of the lead-acid battery, and extend the vehicle placement time.

There being an apparatus wake-up signal is a first condition that the charging circuit can be turned on, and the power source terminal voltage being less than a sixth threshold is a second condition that the charging circuit can be turned on. The first condition and the second condition together are necessary conditions for determining whether the charging circuit can be turned on. Therefore, in S602, only when the above conditions are met, can the first switch unit in the charging circuit be controlled to be closed, so that the charging circuit is turned on.

It is understandable that when any of the above conditions is not met, the charging circuit will not be turned on, so as to maintain a turn-off state of the charging circuit, or make the charging circuit to be turned off.

A third instruction may be issued to the first switch unit in the charging circuit through a BMU interface on the BMS, thereby controlling the first switch unit in the charging circuit to be closed, so that the charging circuit is turned on. The third instruction may be a high low-level signal.

In some embodiments, a delay condition may also be added in step S602, for example, when there is an apparatus wake-up signal, and the power source terminal voltage is less than the sixth threshold, the third instruction is issued after a delay time t, so that the charging circuit is turned on. When a key is inserted into a keyhole on the vehicle and rotated, it is first in an ACC gear, at this time (not reaching an ON gear for ignition yet) the BMS can detect an apparatus wake-up signal (KL15), and if the power source terminal voltage detected at this time is less than the sixth threshold, a third instruction is issued to turn on the charging circuit. When the vehicle is ignited and started with the charging circuit turned on, the lithium battery will discharge to the motor for starting, and cause thermal runaway of the battery described above, thereby causing safety accidents such as battery fire. Therefore, by setting a certain delay time t, and then making the charging circuit to be turned on, the vehicle may be started when the charging circuit of the battery is turned on, so as to avoid that the charging circuit of the battery is turned on when the vehicle is not started, and the charging circuit of the battery has large current discharge when the vehicle is subsequently started, resulting in the switch sticking on the charging circuit, and avoiding the thermal runaway of the battery caused by overcharge of the lithium battery and improving the safety of the battery. The delay time t is set to meet an operating time length of the key from the ACC gear to the ON gear, and for example, it may be set to 10 s, 30 s, or 60 s. It is understandable that in some embodiments, the circuit control method may further include steps in any embodiment of FIG. 1 to FIG. 5, or a combination of steps in the embodiments.

In the above embodiment, by determining whether there is an apparatus wake-up signal and whether the power source terminal voltage is lower than the sixth threshold, the charging circuit is controlled to be turned on when there is an apparatus wake-up signal and the power source terminal voltage is lower than the sixth threshold, and a lithium battery is used to charge a lead-acid battery, so as to avoid the problem that a vehicle cannot be started due the power loss of the lead-acid battery when the vehicle is placed for a long time.

Figure 7:
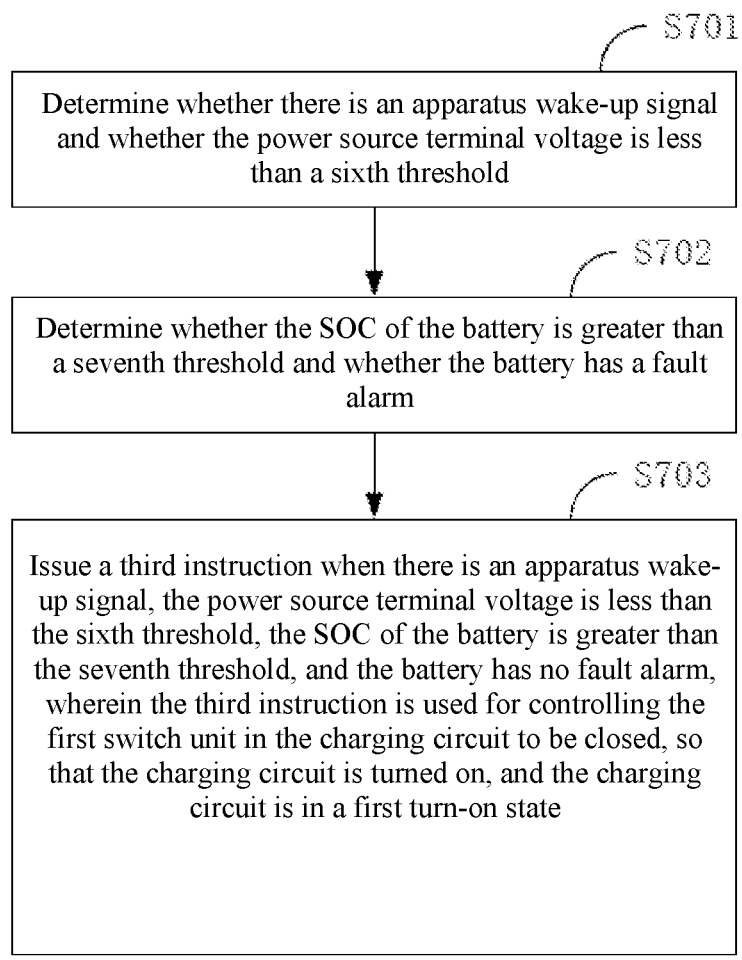
FIG. 7 is a schematic flowchart of a circuit control method according to some embodiments of the present application.

In some embodiments, on the basis of the embodiment shown in FIG. 6, other conditions for turning on of the charging circuit may also be set. FIG. 7 is a schematic flowchart of a circuit control method according to some embodiments of the present application. As shown in FIG. 7, the circuit control method includes the following steps:

S701: Determine whether there is an apparatus wake-up signal and whether the power source terminal voltage is less than a sixth threshold;

S702: Determine whether the SOC of the battery is greater than a seventh threshold and whether the battery has a fault alarm; and S703: Issue a third instruction when there is an apparatus wake-up signal, the power source terminal voltage is lower than the sixth threshold, the SOC of the battery is greater than the seventh threshold, and the battery has no fault alarm, wherein the third instruction is used for controlling the first switch unit in the charging circuit to be closed, so that the charging circuit is turned on, and the charging circuit is in a first turn-on state.

The specific implementation process of S701 is basically the same as that of S601 in the previous embodiment, and the implementation process may be obtained with reference to the previous description.

The SOC of the battery being greater than the seventh threshold is a third condition that the charging circuit can be turned on, and the battery having no fault alarm is a fourth condition that the charging circuit can be turned on.

If the lead-acid battery is continuously charged by the lithium battery when the vehicle is placed for a long time, it may cause over-discharge of the lithium battery. The over-discharge may increase the internal voltage of the lithium battery, the reversibility of the positive and negative electrode active materials may be damaged, and the capacity may be significantly attenuated. Therefore, by setting a seventh threshold, if the SOC of the battery is less than or equal to the seventh threshold, it indicates that the battery is not suitable for discharging, the third condition is not met at this time, and the charging circuit cannot be turned on, so as to avoid the over-discharge of the lithium battery due to the continuous charging the lead-acid battery by the lithium battery when the vehicle is placed for a long time. Only when the SOC of the battery is greater than the seventh threshold, can the charging circuit be turned on, and the lithium battery charges the lead-acid battery. The seventh threshold may be set according to a discharge cut-off SOC value of the lithium battery. For example, the seventh threshold is set to 15%.

If the battery has a fault alarm, the battery cannot be charged; otherwise, it is easy to cause safety problems. Only when the battery has no fault alarm and the fourth condition is met, can the charging circuit be controlled to be turned on, thereby avoiding the occurrence of safety problems.

The third condition and the fourth condition mentioned above, together with the first condition and the second condition in S601, are used as necessary conditions for determining whether the charging circuit can be turned on. Therefore, in S703, only when the above conditions are met, can the first switch unit in the charging circuit be controlled to be closed, so that the charging circuit is turned on.

It is understandable that when any of the above conditions is not met, the charging circuit will not be turned on, so as to maintain a turn-off state of the charging circuit, or make the charging circuit to be turned off.

In the above embodiment, by determining whether the SOC of the battery is greater than the seventh threshold and whether the battery has a fault alarm, the charging circuit is controlled to be turned on when the SOC of the battery is greater than the seventh threshold and the battery has no fault alarm, so as to avoid over-discharge of the lithium battery and safety problems.

Figure 8:
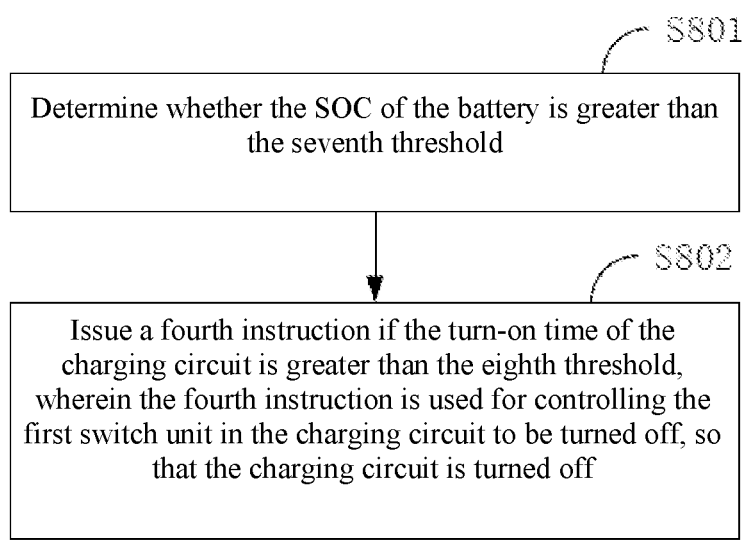
FIG. 8 is a schematic flowchart of a circuit control method according to some embodiments of the present application.

In some embodiments, a technical solution of how to control the charging circuit to be turned off after the battery has been placed for a long time and its charging circuit is controlled to be turned on is further provided. FIG. 8 is a schematic flowchart of a circuit control method according to some embodiments of the present application. As shown in FIG. 8, the circuit control method includes the following steps:

S801: Determine, in a first turn-on state, whether a turn-on time of the charging circuit is greater than an eighth threshold; and S802: Issue a fourth instruction if the turn-on time of the charging circuit is greater than the eighth threshold, wherein the fourth instruction is used for controlling the first switch unit in the charging circuit to be turned off, so that the charging circuit is turned off.

The turn-on time of the charging circuit being greater than the eighth threshold is a first condition that the charging circuit needs to be turned off. The first turn-on state, that is, the first turn-on state in the embodiment shown in FIG. 6 or FIG. 7, is a turn-on state of the charging circuit when the charging circuit of the battery is controlled to be turned on after the battery is placed for a long time, which is different from the turn-on state of the charging circuit in the embodiment shown in FIG. 1 to FIG. 5.

After the vehicle has been placed for a long time, in order to solve the problem that the lead-acid battery is out of power and the vehicle cannot be started, the lithium battery may be used for charging the lead-acid battery through the embodiments shown in FIG. 6 to FIG. 7 above. The lithium battery charges the lead-acid battery to meet the electrical energy required for the vehicle to start once, and may stop charging. Therefore, by setting the eighth threshold, when the turn-on time of the charging circuit is greater than the eighth threshold, it indicates that the power of the lead-acid battery has been able to meet the electrical energy required for the vehicle to start once, and the charging circuit can be turned off to stop charging. The eighth threshold may be set according to the time for charging the lead-acid battery to meet the electrical energy required for the vehicle to start once.

A fourth instruction may be issued to the first switch unit in the charging circuit through a BMU interface on the BMS, thereby controlling the first switch unit in the charging circuit to be turned off, so that the charging circuit is turned off. The fourth instruction may be a high low-level signal.

In some embodiments, other conditions for the turning off of the charging circuit may also be set, for example, there being no apparatus wake-up signal is a second condition that the charging circuit needs to be turned off, and the battery has no fault alarm is a third condition that the charging circuit needs to be disconnected. The first condition, the second condition, and the third condition above are used as necessary conditions for determining whether the charging circuit needs to be turned off after the charging circuit of the battery is turned on. When any one of the above conditions is met, the first switch unit in the charging circuit may be controlled to be turned off, so that the charging circuit is turned off.

In the above embodiment, by determining whether the turn-on time of the charging circuit is greater than the eighth threshold, the charging circuit is controlled to be turned off when the turn-on time of the charging circuit is greater than the eighth threshold, which not only ensures that the lithium battery can charge the lead-acid battery to meet electric energy required for the vehicle to start once, but also avoids over-discharge of the lithium battery.

Figure 9:
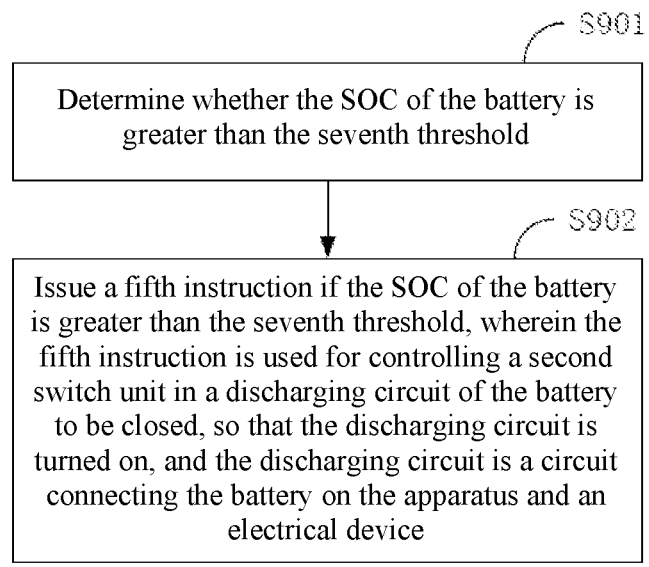
FIG. 9 is a schematic flowchart of a circuit control method according to some embodiments of the present application.

In some embodiments, a technical solution of how to control the discharging circuit of the battery to be turned on is further provided. FIG. 9 is a schematic flowchart of a circuit control method according to some embodiments of the present application. As shown in FIG. 9, the circuit control method includes the following steps:

S901: Determine whether the SOC of the battery is greater than the seventh threshold;

S902: Issue a fifth instruction if the SOC of the battery is greater than the seventh threshold, wherein the fifth instruction is used for controlling a second switch unit in a discharging circuit of the battery to be closed, so that the discharging circuit is turned on, and the discharging circuit is a circuit connecting the battery on the apparatus and an electrical device.

The discharging circuit is the circuit connecting the battery on the apparatus to the electrical device, and specifically, may be the discharging circuit B connecting the lithium battery to the electrical device FIG. 2, and a discharging circuit B1 in FIG. 3. The second switch unit may be K2 in FIG. 2, and may be an element, such as a relay, that can realize turning on and turning off of the circuit. It is understandable that the second switch unit is located inside the lithium battery.

The SOC of the battery being greater than the seventh threshold is a first condition that the discharging circuit can be turned on.

The lithium battery is a power source that powers the electrical device, such as a battery that powers a parking air conditioner. If the lithium battery powers the electrical device continuously when the electrical device operates for a long time, it may cause over-discharge of the lithium battery. The over-discharge may increase the internal voltage of the lithium battery, the reversibility of the positive and negative electrode active materials may be damaged, and the capacity may be significantly attenuated. Therefore, by setting a seventh threshold, if the SOC of the battery is less than or equal to the seventh threshold, it indicates that the battery is not suitable for discharging, the first condition is not met at this time, and the discharging circuit cannot be turned on, so as to avoid the over-discharge of the lithium battery due to the continuous charging the electrical device by the lithium battery. Only when the SOC of the battery is greater than the seventh threshold, can the discharging circuit be turned on, and the lithium battery charges the electrical device. The seventh threshold may be set according to a discharge cut-off SOC value of the lithium battery. For example, the seventh threshold is set to 15%.

A fifth instruction may be issued to the second switch unit in the discharging circuit through a BMU interface on the BMS, thereby controlling the second switch unit in the discharging circuit to be closed, so that the discharging circuit is turned on. The fifth instruction may be a high low-level signal.

In some embodiments, other conditions for the turning on of the discharging circuit may also be set, for example, there being an apparatus wake-up signal is a second condition that the discharging circuit can be turned on, and the battery has no fault alarm is a third condition that the discharging circuit can be turned on. The first condition, the second condition, and the third condition together are used as necessary conditions for determining whether the discharging circuit can be turned on. Only when the above conditions are met, can the second switch unit in the discharging circuit be controlled to be closed, so that the discharging circuit is turned on.

It is understandable that when any of the above conditions is not met, the discharging circuit will not be turned on, so as to maintain a turn-off state of the discharging circuit, or make the discharging circuit to be turned off.

In the above embodiment, by determining whether the SOC of the battery is greater than the seventh threshold, the discharging circuit of the battery is controlled to be turned on when the SOC of the battery is greater than the seventh threshold, so as to avoid over-discharge of the lithium battery.

Figure 10:
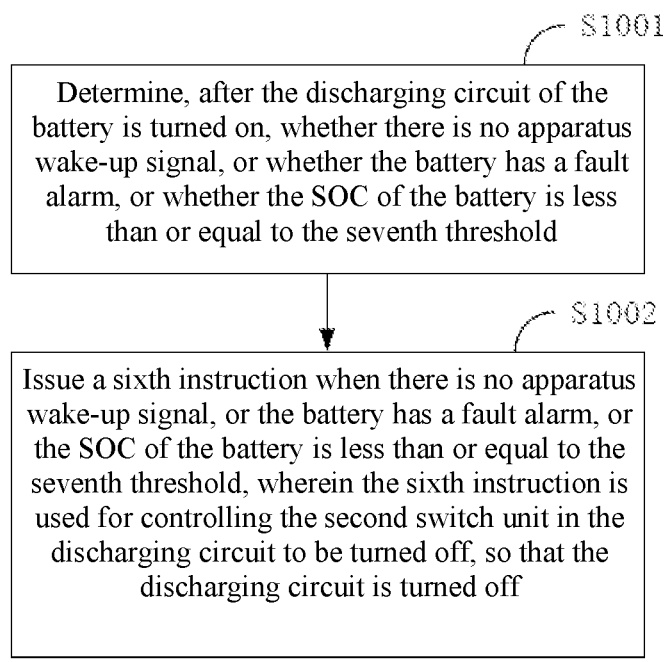
FIG. 10 is a schematic flowchart of a circuit control method according to some embodiments of the present application.

In some embodiments, a technical solution of how to control the discharging circuit of the battery to be turned off after it is turned on is further provided. FIG. 10 is a schematic flowchart of a circuit control method according to some embodiments of the present application. As shown in FIG. 10, the circuit control method includes the following steps:

S1001: Determine, after the discharging circuit of the battery is turned on, whether there is no apparatus wake-up signal, or whether the battery has a fault alarm, or whether the SOC of the battery is less than or equal to the seventh threshold; and S1002: Issue a sixth instruction when there is no apparatus wake-up signal, or the battery has a fault alarm, or the SOC of the battery is less than or equal to the seventh threshold, wherein the sixth instruction is used for controlling the second switch unit in the discharging circuit to be turned off, so that the discharging circuit is turned off.

There being no apparatus wake-up signal is a first condition that the discharging circuit needs to be turned off, there being no fault alarm is a second condition that the discharging circuit needs to be disconnected, and the SOC of the battery being less than or equal to the seventh threshold is a third condition that the discharging circuit needs to be disconnected.

If there is no apparatus wake-up signal, it indicates that the vehicle has not been started, and there is no need to supply power to the electrical device by the lithium battery, the first condition is not met, and there is no need to control the discharging circuit to be turned on.

If the battery has a fault alarm, the battery cannot be discharged; otherwise, it is easy to cause safety problems. At this time, the second condition is met, and it is required to control the discharging circuit to be turned off to avoid safety problems.

If the lithium battery powers the electrical device continuously when the electrical device operates for a long time, it may cause over-discharge of the lithium battery. The over-discharge may increase the internal voltage of the lithium battery, the reversibility of the positive and negative electrode active materials may be damaged, and the capacity may be significantly attenuated. Therefore, by setting the seventh threshold, if the SOC of the battery is less than or equal to the seventh threshold, it indicates that the battery is not suitable for discharging, the third condition is met at this time, and the discharging circuit needs be turned off, so as to avoid the over-discharge of the lithium battery due to the continuous charging the electrical device by the lithium battery. The seventh threshold may be set according to a discharge cut-off SOC value of the lithium battery. For example, the seventh threshold is set to 15%.

The first condition, the second condition, and the third condition above are used as necessary conditions for determining whether the discharging circuit needs to be turned off after the discharging circuit of the battery is turned on. Therefore, in S1002, when any one of the above conditions is met, the second switch unit in the discharging circuit may be controlled to be turned off, so that the discharging circuit is turned off.

A sixth instruction may be issued to the second switch unit in the discharging circuit through a BMU interface on the BMS, thereby controlling the second switch unit in the discharging circuit to be turned off, so that the discharging circuit is turned off. The sixth instruction may be a high low-level signal.

It is understandable that in some embodiments, the circuit control method may further include steps in the embodiment shown in FIG. 9.

In the above embodiments, by determining whether there is no apparatus wake-up signal, or whether the battery has a fault alarm, or whether the SOC of the battery is less than or equal to the seventh threshold, the discharging circuit is controlled to be turned off when there is no apparatus wake-up signal, or the battery has a fault alarm, or the SOC of the battery is less than or equal to the seventh threshold, so as to avoid the over-discharge of the lithium battery and safety problems.

Figure 11:
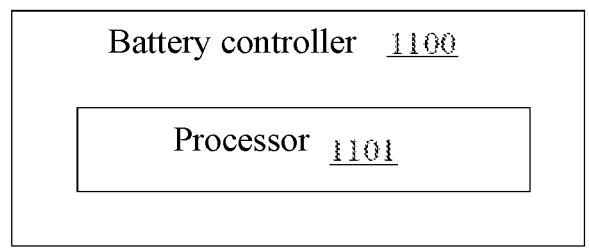
FIG. 11 is a schematic structural diagram of a battery controller according to some embodiments of the present application.

The circuit control method of the embodiments of the present application are described above with reference to FIG. 1 to FIG. 10, and the battery controller of the embodiments of the present application are described below with reference to FIG. 11. For the parts not described in detail, reference may be made to the foregoing embodiments. FIG. 11 is a schematic structural diagram of a battery controller according to some embodiments of the present application. As shown in FIG. 11, a battery controller 1100 includes one or a plurality of processors 1101 working independently or jointly, and the processor 1101 is used for performing the steps of the circuit control method in the above embodiments.

Figure 12:
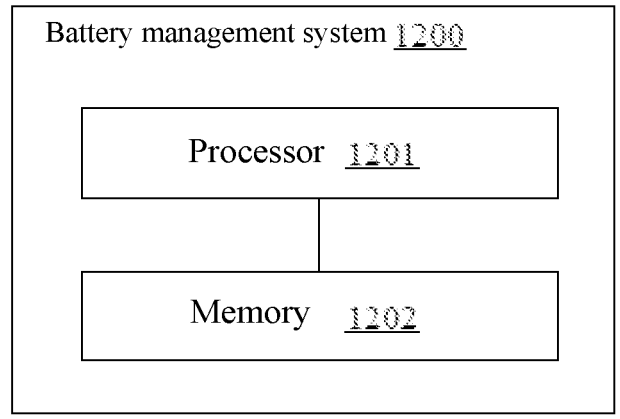
FIG. 12 is a schematic structural diagram of a battery management system according to some embodiments of the present application.

A battery management system of the embodiment of the present application will be described below with reference to FIG. 12, and parts not described in detail may be obtained with reference to the previous embodiments. FIG. 12 is a schematic structural diagram of a battery management system according to some embodiments of the present application. As shown in FIG. 12, a battery management system 1200 includes: at least one processor 1201; and a memory 1202 communicatively connected to the at least one processor 1201; wherein, the memory 1202 stores instructions that can be executed by the at least one processor 1201, and the instructions are executed by the at least one processor 1201 to cause the at least one processor 1201 to realize the steps of the circuit control method in the above embodiment.

Figure 13:
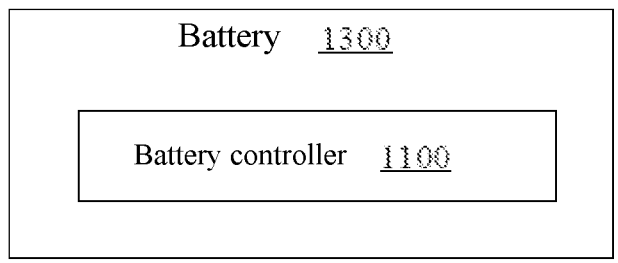
FIG. 13 is a schematic structural diagram of a battery according to some embodiments of the present application.

The battery of the embodiment of the present application will be described below with reference to FIG. 13, and parts not described in detail may be obtained with reference to the previous embodiments. FIG. 13 is a schematic structural diagram of a battery according to some embodiments of the present application. As shown in FIG. 13, a battery 1300 includes the battery controller 1100 as shown in FIG. 11.

Figure 14:
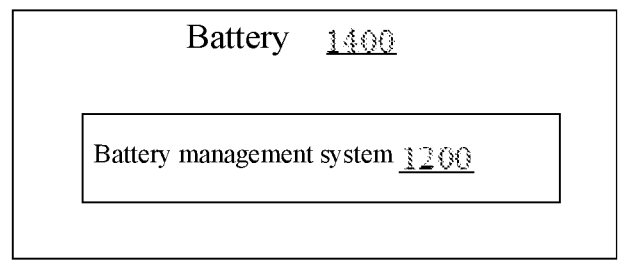
FIG. 14 is a schematic structural diagram of a battery according to some embodiments of the present application.

The battery of the embodiment of the present application will be described below with reference to FIG. 14, and parts not described in detail may be obtained with reference to the previous embodiments. FIG. 14 is a schematic structural diagram of a battery according to some embodiments of the present application. As shown in FIG. 14, a battery 1400 includes the battery management system 1200 as shown in FIG. 12.

Figure 15:
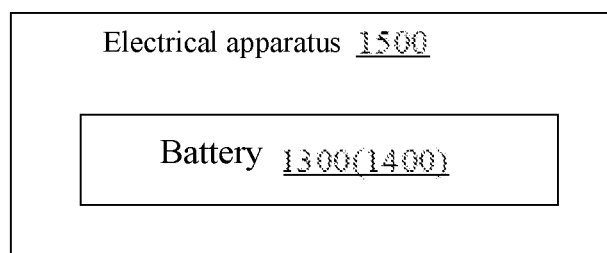
FIG. 15 is a schematic structural diagram of an electrical apparatus according to some embodiments of the present application.

The electrical apparatus of the embodiment of the present application will be described below with reference to FIG. 15, and parts not described in detail may be obtained with reference to the previous embodiments. FIG. 15 is a schematic structural diagram of an electrical apparatus according to some embodiments of the present application. As shown in FIG. 15, an electrical apparatus 1500 includes the battery 1300 or the battery 1400 of the above embodiment.

Figure 16:
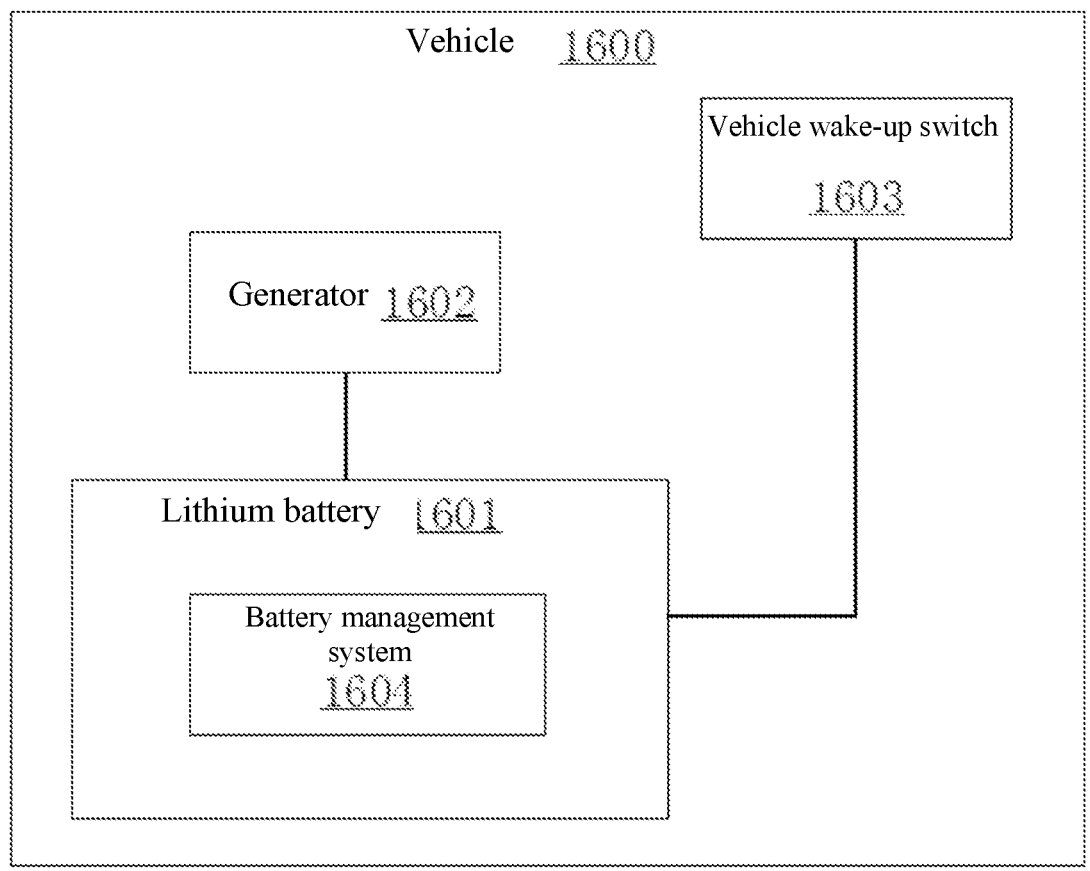
FIG. 16 is a schematic structural diagram of a vehicle according to some embodiments of the present application.

The vehicle of the embodiment of the present application will be described below with reference to FIG. 16, and parts not described in detail may be obtained with reference to the previous embodiments. FIG. 16 is a schematic structural diagram of a vehicle according to some embodiments of the present application. As shown in FIG. 16, a vehicle 1600 includes a lithium battery 1601, a generator 1602, and a vehicle wake-up switch 1603; wherein the lithium battery 1601 is connected to the generator 1602 to form a charging circuit, the lithium battery 1601 includes a battery management system 1604, and the battery management system 1604 is used for:
    acquiring a vehicle wake-up signal;
    determining whether a power source terminal voltage of a charging circuit of the lithium battery on the vehicle is greater than a first threshold and whether a change rate in a first time length is less than a second threshold, wherein the charging circuit is a circuit connecting the lithium battery on the vehicle and the generator, and the power source terminal voltage is an output voltage of the generator; and
    issuing a first instruction when the power source terminal voltage of the charging circuit of the battery on the vehicle is greater than the first threshold and the change rate in the first time length is less than the second threshold, wherein the first instruction is used for controlling a first switch unit in the charging circuit to be closed, so that the charging circuit is turned on.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

The invention claimed is:

1. A circuit control method, comprising:
    acquiring an apparatus wake-up signal;
    determining whether a power source terminal voltage of a charging circuit of a battery on the apparatus is greater than a first threshold and whether a power source terminal voltage change rate in a first time length is less than a second threshold, wherein the charging circuit is a circuit connecting the battery on the apparatus and a generator, and the power source terminal voltage is an output voltage of the generator; and
    issuing a first instruction when the power source terminal voltage of the charging circuit of the battery on the apparatus is greater than the first threshold and the power source terminal voltage change rate in the first time length is less than the second threshold, wherein the first instruction is used for controlling a first switch unit in the charging circuit to be closed, so that the charging circuit is turned on.

2. The method according to claim 1, wherein the method further comprises:
    determining whether a state of charge (SOC) of the battery is greater than a third threshold, whether the battery has a fault alarm, and whether a battery cell temperature of the battery is in a first range; and
    issuing the first instruction when the power source terminal voltage of the charging circuit of the battery on the apparatus is greater than the first threshold and the terminal voltage change rate in the first time length is less than the second threshold, and further comprises:
    issuing the first instruction when the power source terminal voltage of the charging circuit of the battery on the apparatus is greater than the first threshold, the power source terminal voltage change rate in the first time length is less than the second threshold, the SOC of the battery is greater than the third threshold, the battery has no fault alarm, and the battery cell temperature of the battery is in the first range.

3. The method according to claim 1, wherein the method further comprises:
determining, after the charging circuit of the battery is turned on, whether a change rate of a charging current of the battery in a second time length is greater than a fourth threshold, or whether a voltage of the battery cell in the battery is greater than or equal to a fifth threshold, or whether the battery has a fault alarm, or whether the battery cell temperature is not in the first range; and
issuing a second instruction when the change rate of the charging current of the battery in the second time length is greater than the fourth threshold, or the voltage of the battery cell in the battery is greater than or equal to the fifth threshold, or the battery has a fault alarm, or the battery cell temperature is not in the first range, wherein the second instruction is used for controlling the first switch unit in the charging circuit to be turned off, so that the charging circuit is turned off.

4. The method according to claim 1, wherein the method further comprises:
determining whether there is an apparatus wake-up signal and whether the power source terminal voltage is less than a sixth threshold; and
issuing a third instruction when there is an apparatus wake-up signal and the power source terminal voltage is lower than the sixth threshold, wherein the third instruction is for controlling the first switch unit in the charging circuit to be closed, so that the charging circuit is turned on, and the charging circuit is in a first turn-on state.

5. The method according to claim 4, wherein the method further comprises:
determining whether the SOC of the battery is greater than a seventh threshold and whether the battery has a fault alarm; and
issuing the third instruction when there is an apparatus wake-up signal and the power source terminal voltage is less than the sixth threshold, and further comprises:
issuing the third instruction when there is an apparatus wake-up signal, the power source terminal voltage is less than the sixth threshold, the SOC of the battery is greater than the seventh threshold, and the battery has no fault alarm.

6. The method according to claim 5, wherein the method further comprises:
determining, in the first turn-on state, whether a turn-on time of the charging circuit is greater than an eighth threshold; and
issuing a fourth instruction if the turn-on time of the charging circuit is greater than the eighth threshold, wherein the fourth instruction is used for controlling the first switch unit in the charging circuit to be turned off, so that the charging circuit is turned off.

7. The method according to claim 1, wherein the method further comprises:
determining whether the SOC of the battery is greater than the seventh threshold; and
issuing a fifth instruction if the SOC of the battery is greater than the seventh threshold, wherein the fifth instruction is used for controlling a second switch unit in a discharging circuit of the battery to be closed, so that the discharging circuit is turned on, and the discharging circuit is a circuit connecting the battery on the apparatus and an electrical device.

8. The method according to claim 7, wherein the method further comprises:
determining, after the discharging circuit of the battery is turned on, whether there is the apparatus wake-up signal, or whether the battery has a fault alarm, or whether the SOC of the battery is less than or equal to the seventh threshold; and
issuing a sixth instruction when there is the apparatus wake-up signal, or the battery has a fault alarm, or the SOC of the battery is less than or equal to the seventh threshold, wherein the sixth instruction is used for controlling the second switch unit in the discharging circuit to be turned off, so that the discharging circuit is turned off.

9. A battery controller , comprising: one or a plurality of processors working individually or jointly, the processors being used for performing the steps of the circuit control method according to claim 1.

10. A battery management system, wherein:
at least one processor; and
a memory communicatively connected to the at least one processor; and, wherein
the memory stores instructions executable by the at least one processor, the instructions are executed by the at least one processor so that the at least one processor performs the steps of the circuit control method according to claim 1.

11. A battery, comprising the battery management system according to claim 9, or the battery management system according to claim 10.

12. An electrical apparatus, comprising the battery according to claim 11, wherein the battery is configured to provide electric energy.

13. A vehicle, comprising a lithium battery, a generator, and a vehicle wake-up switch; wherein the lithium battery is connected to the generator to form a charging circuit, the lithium battery comprises a battery management system, and the battery management system is used for:
acquiring a vehicle wake-up signal;
determining whether a power source terminal voltage of a charging circuit of the lithium battery on the vehicle is greater than a first threshold and whether a power source terminal voltage change rate in a first time length is less than a second threshold, wherein the charging circuit is a circuit connecting the lithium battery on the vehicle and the generator, and the power source terminal voltage is an output voltage of the generator; and
issuing a first instruction when the power source terminal voltage of the charging circuit of the battery on the vehicle is greater than the first threshold and the power source terminal voltage change rate in the first time length is less than the second threshold, wherein the first instruction is used for controlling a first switch unit in the charging circuit to be closed, so that the charging circuit is turned on.

* * * * *